Figure 1:
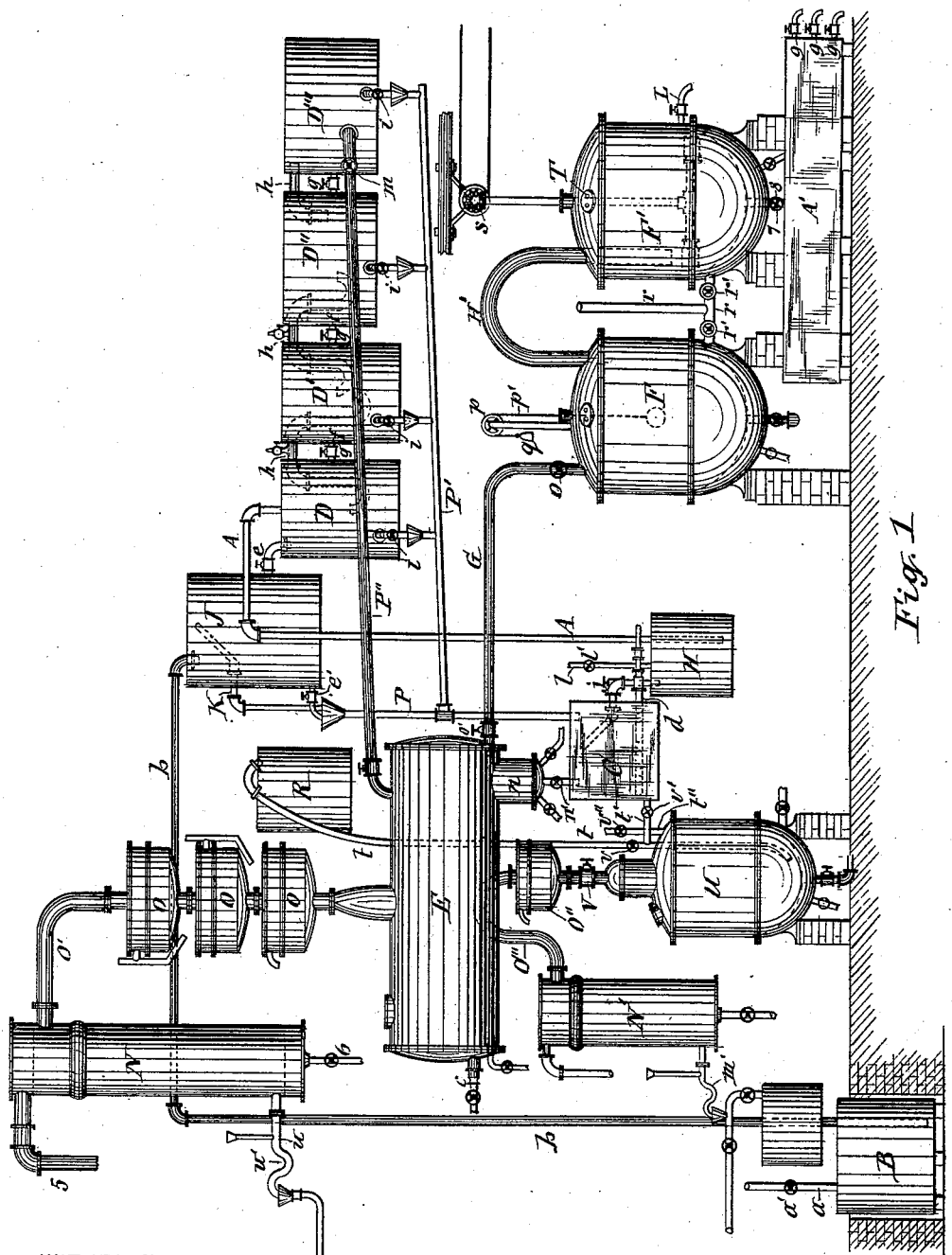

(No Model.)  3 Sheets—Sheet 1.

C. J. T. BURCEY.
APPARATUS FOR DISTILLING PYROLIGNEOUS ACID.

No. 414,937.  Patented Nov. 12, 1889.

WITNESSES:

INVENTOR

BY

ATTORNEYS

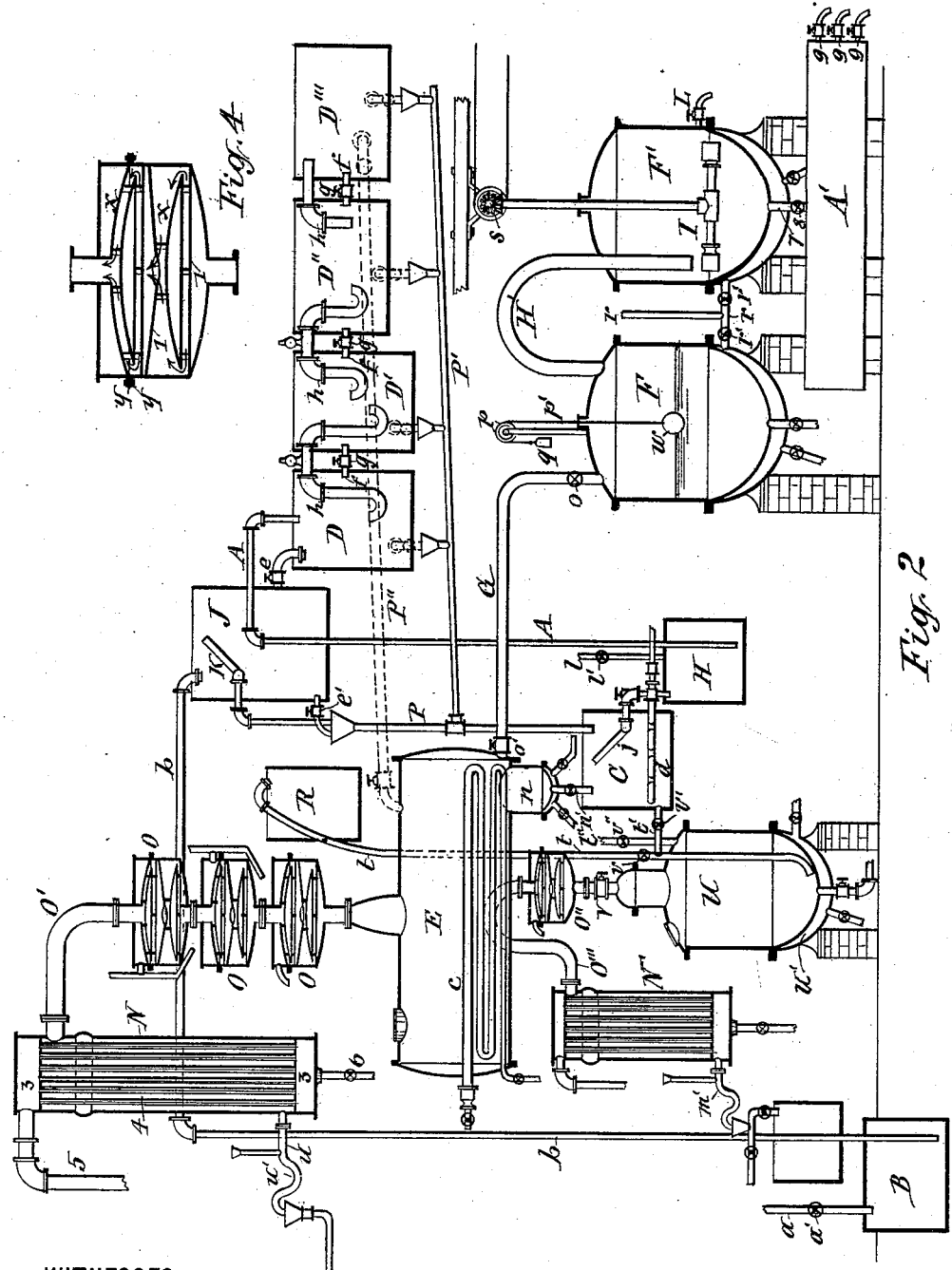

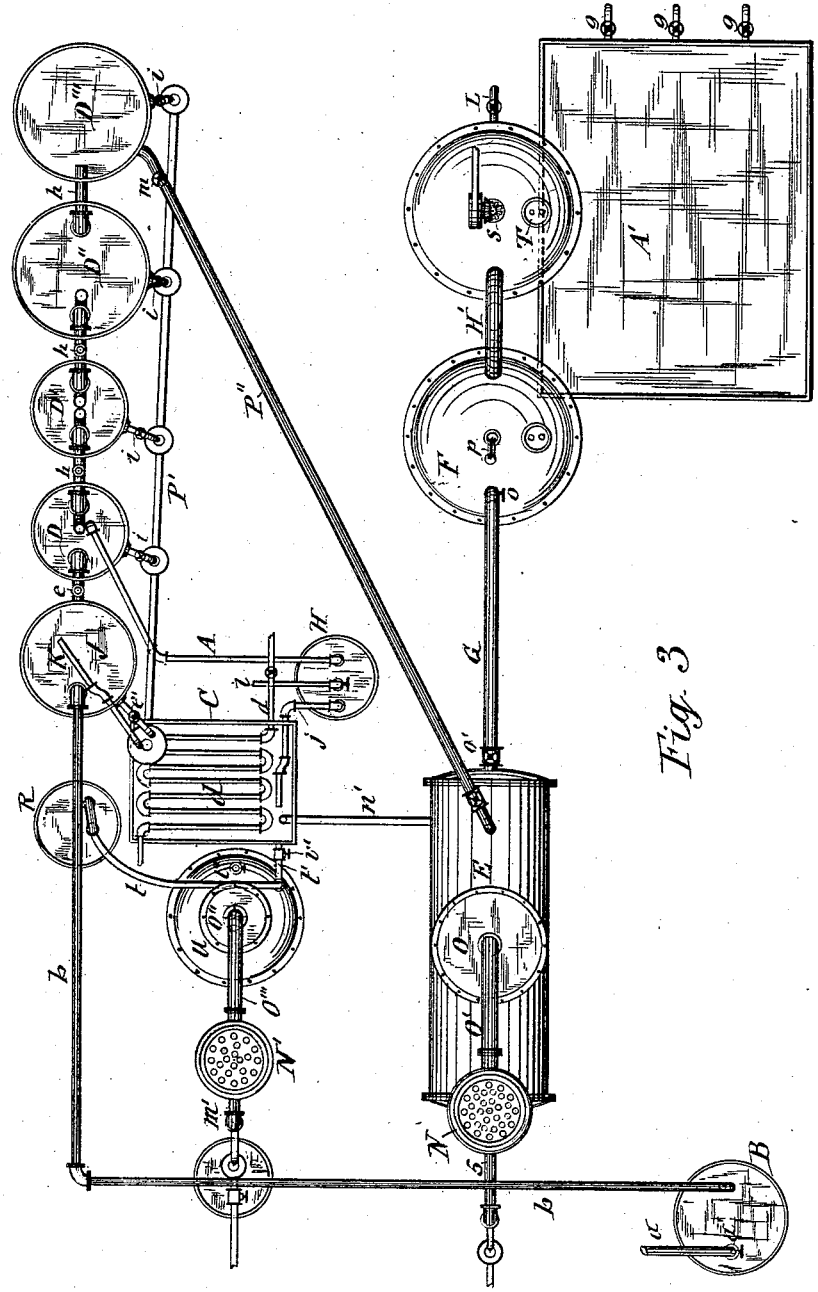

UNITED STATES PATENT OFFICE.

CHARLES J. T. BURCEY, OF SYRACUSE, NEW YORK.

APPARATUS FOR DISTILLING PYROLIGNEOUS ACID.

SPECIFICATION forming part of Letters Patent No. 414,937, dated November 12, 1889.

Application filed November 15, 1888. Serial No. 290,949. (No model.)

*To all whom it may concern:*

Be it known that I, CHARLES J. T. BURCEY, of Syracuse, in the county of Onondaga, in the State of New York, have invented new and useful Improvements in Apparatus for Distilling Pyroligneous Acid, of which the following, taken in connection with the accompanying drawings, is a full, clear, and exact description.

This invention consists in a novel construction of an apparatus by means of which pyroligneous acid is treated so as to separate the tar-acid and wood-alcohol from each other, and by which apparatus also the pyroligneous acid is mixed with soda and lime, so as to produce acetate of soda, all as hereinafter fully described, and specifically set forth in the claims.

In the annexed drawings, Figure 1 is an elevation of my improved distilling apparatus. Fig. 2 is a vertical transverse section of the same. Fig. 3 is a plan view, and Fig. 4 is a detached vertical transverse section, of one of the deflecting-pans employed in the aforesaid apparatus.

Similar letters of reference indicate corresponding parts.

B represents an air-tight tank containing the pyroligneous acid to be distilled.

J denotes another tank, preferably placed at a suitable elevation above the tank B and to receive the pyroligneous acid from the latter through a pipe $b$, one end of which is extended into the tank B, and has its receiving end near the bottom of said tank. The opposite or discharge end of said pipe communicates with the open top of the tank J.

$a$ is a pipe, which is connected to a suitable air-compressor, (not shown in the drawings,) and communicates with the interior of the tank B at the top thereof and is provided with a stop-cock $a'$. By admitting air under pressure into the tank B the pyroligneous acid is forced out from said tank and through the pipe $b$ into the tank J. In this latter tank is effected the first step in the process of separating the ingredients of the pyroligneous acid, and for that purpose it is provided with an overflow-pipe K at the upper part of its interior, a draw-off cock $e'$ at its base, and a draw-off cock $e$ at a point intermediate of its height. The said draw-off cocks are closed and the mouth of the overflow-pipe raised above the tank until the latter has been charged to the desired extent with pyroligneous acid, and after this acid has been allowed to remain tranquil to allow the oily matter to rise to the top and the tar to settle the overflow-pipe is placed in position to draw off the supernatant oily matter. After this is effected the cock $e$ is opened to draw off the acid.

D D' D'' D''' represent a set of tanks arranged with their tops in one and the same plane and communicating successively one with the other by siphons $h$ $h$ $h$ and by pipes $f f f$, tapping the tanks at points intermediate of their heights and provided with valves $g g g$. The first tank D is arranged in position to receive the discharge from the draw-off cock $e$, and when said tank is full the acid flows through the siphon $h$ to the next tank D' and thence successively to the tanks D'' D''', through their respective siphons, and in this manner all of said tanks are maintained full. When it is desired to retain a less quantity of acid in the tanks D D' D'', the valves $g g g$ are opened to allow the acid to flow through the pipes $f f f$. Each of the tanks D D' D'' D''' is also provided with a draw-off cock $i$ at its base for drawing off the tar, which is conducted by a pipe P' to a pipe P, which has its upper end arranged to receive also the tar from the cock $e'$ and the oily matter from the overflow-pipe K. The lower end of the pipe P communicates with a tank C, in which all the tarry and oily matter is collected. The tank D''' is tapped a short distance above the draw-off cock $i$ by a pipe P'', which has its opposite end connected to and communicating with a still E and conducts thereto the acid from the aforesaid tank. This still is heated by steam passing through a serpentine or coiled pipe $c$, arranged inside of the said still, as best seen in Fig. 2 of the drawings, and by heating the acid introduced into the still the wood-alcohol becomes vaporized and separated from the acid.

Upon the still E is mounted a column of deflectors O O O, through which the vaporized alcohol from the still E ascends, said deflectors being similar to those shown in my prior patent, No. 263,852, dated September 5, 1882, and consisting of chambers having dished plates 1 with central openings and crowning-plates *x* over the dished plates. The vapor passing through the central openings of the dished plates and around the edges of the crowning-plates and over the top of the same, as indicated by arrows in Fig. 4 of the drawings, and in said passage of the vapor the heavy or partially-condensed portion thereof is detained and deflected and caused to return to the still E.

N represents a condenser of the form of an upright cylinder having water-compartments 3 3 at opposite ends, and flues 4 4 4, connecting said compartments. A pipe 6 is connected to the lower compartment 3 to admit cold water thereto, and a pipe 5 is connected to the upper compartment to draw off the heated water. The vaporized wood-alcohol is conducted from the uppermost deflector O to the condenser N by a pipe O', and the condensed alcohol is drawn off at the base of the condenser by a pipe *u*, connected thereto and provided with a trap *u'*, to prevent air from entering the condenser.

To the under side of the still E is connected a drum or trap *n*, for collecting tarry matter from the still. This trap is steam-jacketed to heat the contents of the trap and separate the tar from the acid. A pipe *n'* leads from the trap to the tank C to conduct the tar to the latter. This tank is also heated by steam passing through a coil of pipe *d* in the tank, and by said heat the tar is further freed from the acid, which latter rises from the tar.

H is a tank, which is air-tight with the exception of an opening, to which is connected the pipe *j*, by means of which the acid is conducted from the tank C to the tank H. A pipe A has one of its ends extended into the tank H and terminating near the bottom of the interior of said tank. The opposite end of said pipe is extended to and communicates with the interior of the tank D, hereinbefore described. The acid is forced from the tank H and through the pipe A to the tank D by pressure of air conducted from a suitable air-compressor (not shown) to the tank H by a pipe *l*, provided with a valve *l'*. The acid thus introduced into the tank D passes on through the tanks D' D'' D''', together with the acid introduced from the tank J through the cock *e*.

U represents another still heated by steam introduced into a jacket U', attached to said still. Upon this still is mounted a deflector O'', similar to the deflectors O O, hereinbefore described, and a pipe O''' leads from said deflector to a condenser N', similar to the condenser N.

A pipe *t'* is extended from the base of the tank C and intersects a pipe *t*, which is extended from the lower part of the interior of the still U to a receptacle R, arranged at a suitable elevation above the still. The pipes *t t'* are provided, respectively, with valves *v v'*, and by opening the valve *v'* the tar is allowed to flow from the tank C into the still. Then by closing the two valves *v v'* and opening a valve V between the still and deflector O'' and heating the still whatever alcohol may be in the tar is driven off and escapes in the form of vapor through the deflector O'' and pipe O''' to the condenser N', from the base of which it is drawn by a pipe *m'*, connected thereto. After the alcohol has been eliminated from the tar in the still U the valves V and *v'* are to be closed and the valve *v* opened for the purpose of transferring the tar to the receptacle R, which is effected by introducing into the still U compressed air through a pipe *t''*, which is provided with a valve *v''*, and is connected at one end to the still and at the opposite end to a suitable air-compressor. (Not shown in the drawings.) The heated pyroligneous acid in the still E is conducted from thence through a pipe G to a closed steam-jacketed still F, to the top of which is connected a pipe H', which is extended into another similar steam-jacketed still F'. The pipe G is provided with valves *o o'*, by which to control the flow of acid, and in order to ascertain the amount of acid in the still F the latter is provided with a float *w*, which is suspended by a rope *p'*, passing through an aperture in the top of the still and over a pulley *p*, supported above the still and having a weight *q*, attached to its free end.

*r r* denote the pipes by which steam is admitted to the jackets of the stills F F', said pipes being provided with valves *r' r'*. The interior of the still F' is provided with a rotary agitator I, whose shaft projects through the top of the still and is driven by suitable gears *s* or pulleys, as may be desired. When the still F has been charged to the desired extent with the pyroligneous acid, the valves *o o'* are closed. Then a suitable quantity of lime and sulphate of soda is introduced into the still F' through a hand-hole T, provided with a removable cover, said cover being replaced thereafter. Then steam is admitted into the jacket of the still F to evaporate the pyroligneous acid in said still, the vapor passing through the pipe H' into the still F', which is then also heated by admitting steam to its jacket, and at the same time the agitator is set in motion. The lime and sulphate of soda are put in such proportions into the still as to convert the lime into sulphate of lime. The soda, having a stronger affinity for the acetic acid, becomes combined therewith during the agitation thereof, and thus liquid acetate of soda is produced. Carbonate of soda can be used as well as sulphate of soda. By adding to the lime a suitable quantity of soda it will form a carbonate of lime and an acetate of soda, which will give the same result as sulphate of soda.

The still F' is provided with a faucet L, through which to draw from time to time samples, by which to ascertain when the soda is properly saturated. When no more reaction of the acid is discovered, the entire contents of the still F' are drawn off through a pipe 7, which leads from the bottom of still to an iron tank A', and is provided with a stop-cock 8. In this tank the liquid is retained until the sulphate of lime is precipitated. The liquid acetate of soda remaining on top is drawn off through one of the faucets q q q, attached to the tank. This acetate of soda is subsequently evaporated by a suitable process, which does not pertain to this invention, and by this evaporation chemically-pure crystal acetate of soda is obtained, from which chemically-pure acetic acid can be manufactured.

To permit of readily cleaning or repairing the deflector O when required, I divide the case thereof horizontally at the upper concavo-convex plate X and detachably connect the two sections preferably by providing the same with external flanges y y at their junction and inserting bolts through said flanges, as shown in Fig. 4 of the drawings. The plate X, being attached to the upper section of the case and removed with the same from the lower section, affords free access to the plates in the lower section for cleaning or repairing the same.

Having described my invention, what I claim as new, and desire to secure by Letters Patent, is—

1. In combination with the tank J and tank C, the overflow-pipe K, leading from the tank J to the tank C, the draw-off cocks e' e, respectively, at the base and intermediate of the height of the tank J, the tank D, arranged to receive the discharge of the draw-off cock e, and the tanks D' D" D''', connected with each other and with the tank D by pipes communicating with the same at points intermediate of the heights thereof, draw-off cocks i i i i, tapping the tanks D D' D" D''' at their bases, and the pipe P', communicating with each of the latter draw-off cocks and leading to the tank C, substantially as described and shown.

2. In combination with the tank J, provided with the overflow-pipe K and draw-off cock e near the center of the tank, and the draw-off cock e' at the base of the tank, the tank C, the pipe P, leading from the draw-off cock e' and overflow-pipe K to the tank C, the tank D, arranged to receive the discharge of the cock e, the tanks D' D" D''', communicating with each other and with the tank D at points intermediate of their heights, the discharge-cocks i i i i, connected to the tanks D D' D" D''' at or near the bases thereof, the pipe P', leading from the latter discharge-cocks to the pipe P, a heater for heating the tank C, the tank H, overflow-pipe j, leading from the tank C to the tank H, the still E, and the pipe P", tapping the tank D''' above the discharge-cock i and leading to the still E, substantially as described and shown.

3. In combination with the tank J, provided with the overflow-pipe K and with the draw-off cocks e e', the tank D, arranged to receive the discharge of the draw-off cock e, the tanks D' D" D''', communicating with each other and with the tank D at points intermediate of their heights, the draw-off cocks i i i i, tapping the tanks D D' D" D''' at or near their bases, the pipe P''', tapping the tank D''' above the aforesaid draw-off cock and provided with a valve, the still E, having the discharge end of the pipe P''' connected to it, the deflectors O O O, arranged above the said still and communicating with the same, the condenser N, connected with the upper deflector, and the draw-off pipe u, connected to the base of the condenser and provided with a trap u', substantially as described and shown.

4. The combination of the still E, trap n, connected thereto, the tank C, a pipe n', leading from the trap to said tank, a heater in said tank, the overflow-pipe j, tapping the upper part of said tank, and the tank H, having the discharge end of the overflow-pipe j connected thereto, substantially as set forth and shown.

5. In combination with the tanks J D D' D" D''', communicating with each other, and draw-off cocks attached to the bases of said tanks, the tank C, pipes P P', extending from the aforesaid discharge-cocks to the tank C, a heater in said latter tank, the still U, the pipe t, extending from the bottom of the interior of said still upward from the same, a pipe t', extending from the base of the tank C to the pipe t and provided with the stop-cocks v v', connected, respectively, to said pipes, the deflector O", mounted on the still U, the condenser N', connected with the aforesaid deflector, and the draw-off pipe tapping the base of the condenser.

6. In combination with the tank J, the overflow-pipe K, draw-off cock e', tank C, pipe P, leading from said overflow-pipe and cock to the latter tank, the steam-heating pipe d in the tank C, the overflow-pipe j, connected to said tank, the still U, the pipe t', leading from the base of the tank C to the said still and provided with the valve v', the receptacle R, the pipe t, leading from the still to said receptacle and provided with the valve v, the deflector O", mounted on the still and communicating therewith, the condenser N', pipe O''', leading from the aforesaid deflector to the condenser, and the compressed-air pipe t", connected to the still U and provided with the valve v", substantially as described and shown.

In testimony whereof I have hereunto signed my name, in the presence of two witnesses, at Syracuse, in the county of Onondaga, in the State of New York, this 13th day of November, 1888.

CHARLES J. T. BURCEY. [L. S.]

Witnesses:
C. H. DUELL,
C. L. BENDIXON.